(12) United States Patent
Togo et al.

(10) Patent No.: US 12,204,776 B2
(45) Date of Patent: Jan. 21, 2025

(54) STORAGE MANAGEMENT SYSTEM AND STORAGE MANAGEMENT METHOD

(71) Applicant: Hitachi, Ltd., Tokyo (JP)

(72) Inventors: Kazuki Togo, Tokyo (JP); Akira Deguchi, Tokyo (JP); Tsukasa Shibayama, Tokyo (JP); Takanobu Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/950,189

(22) Filed: Sep. 22, 2022

(65) Prior Publication Data
US 2023/0195336 A1 Jun. 22, 2023

(30) Foreign Application Priority Data
Dec. 22, 2021 (JP) .................. 2021-208703

(51) Int. Cl.
*G06F 3/06* (2006.01)

(52) U.S. Cl.
CPC .......... *G06F 3/0631* (2013.01); *G06F 3/0622* (2013.01); *G06F 3/067* (2013.01)

(58) Field of Classification Search
None
See application file for complete search history.

(56) References Cited

U.S. PATENT DOCUMENTS

| 10,083,100 B1 | 9/2018 | Agetsuma et al. |
| 11,698,813 B2 * | 7/2023 | Moon ................ G06F 9/5077 718/1 |
| 2020/0104153 A1 * | 4/2020 | Shibayama .......... G06F 3/0631 |

FOREIGN PATENT DOCUMENTS

| JP | 2011-128706 W | 6/2011 |
| JP | 2019-101703 A | 6/2019 |
| WO | 2017/085870 A1 | 5/2017 |
| WO | 2017/208360 A1 | 12/2017 |

OTHER PUBLICATIONS

Japanese Office Action received in corresponding Japanese Application No. 2021-208703 dated Dec. 5, 2023.

* cited by examiner

*Primary Examiner* — Charles J Choi
(74) *Attorney, Agent, or Firm* — MATTINGLY & MALUR, PC

(57) ABSTRACT

An object of the invention is to quickly and appropriately adjust performance of a storage system. Provided is a storage management system including: a storage system including a plurality of storage nodes; and a management device. The storage node includes a storage device and an instance to which a resource is virtually allocated and that controls access to the storage device. The storage management system further includes an instance management node configured to manage the instance of the storage node. The management device is configured to determine whether a configuration of the resource allocated to the instance of the storage node needs to be changed, and cause the instance management node to change the configuration of the resource allocated to the instance when the configuration of the resource needs to be changed.

13 Claims, 18 Drawing Sheets

FIG. 6

INSTANCE MANAGEMENT TABLE (3100)

| NODE ID (3101) | CPU FREQUENCY (3102) | NUMBER OF CPU CORES (3103) | MEMORY CAPACITY (3104) | NETWORK BANDWIDTH (3105) |
|---|---|---|---|---|
| 1 | 3.1GHz | 32 | 256GiB | 10Gbps |
| 2 | 3.1GHz | 32 | 256GiB | 10Gbps |
| 3 | 3.1GHz | 32 | 256GiB | 10Gbps |
| ... | ... | ... | ... | ... |

FIG. 7

OPERATION INFORMATION MANAGEMENT TABLE (3200)

| NODE ID (3201) | INFORMATION COLLECTION TIME POINT (3202) | CPU OPERATION RATE (3203) | MEMORY USAGE AMOUNT (3204) | NETWORK USAGE BANDWIDTH (3205) |
|---|---|---|---|---|
| 1 | 2021/4/1 12:00:00 | 50 % | 200 GiB | 10 Gbps |
| 2 | 2021/4/1 12:00:05 | 60 % | 205 GiB | 10 Gbps |
| 3 | 2021/4/1 12:00:10 | 90 % | 190 GiB | 9 Gbps |
| 1 | 2021/4/1 12:01:00 | 45 % | 200 GiB | 10 Gbps |
| 2 | 2021/4/1 12:01:05 | 55 % | 205 GiB | 10 Gbps |
| ... | ... | ... | ... | ... |

FIG. 8

HOST I/O MANAGEMENT TABLE (3300)

| INFORMATION COLLECTION TIME POINT (3301) | IOPS (3302) | TRANSFER RATE (3303) |
|---|---|---|
| 2021/4/1 10:00:00 | 10 kIOPS | 78 MB/s |
| 2021/4/1 10:00:30 | 9 kIOPS | 70 MB/s |
| 2021/4/1 10:01:00 | 10 kIOPS | 78 MB/s |
| ... | | ... |

FIG. 9

PERFORMANCE BOTTLENECK MANAGEMENT TABLE 3400

| BOTTLENECK ID 3401 | INFORMATION RECORDING TIME POINT 3402 | NODE ID 3403 | PERFORMANCE BOTTLENECK PORTION 3404 | REQUIRED RESOURCE ENHANCEMENT RATIO 3405 | BOTTLENECK ELIMINATION METHOD DETERMINATION COMPLETION 3406 |
|---|---|---|---|---|---|
| 1 | 2021/4/2 10:00:00 | 1 | CPU | 2 TIMES | True |
| 2 | 2021/4/2 10:00:30 | 1 | NETWORK I/F | 1.5 TIMES | True |
| 3 | 2021/4/2 10:01:00 | 2 | CPU | 2 TIMES | False |
| ... | ... | | | ... | |

FIG. 10

| INSTANCE TYPE MANAGEMENT TABLE | | | | |
|---|---|---|---|---|
| INSTANCE TYPE ID | CPU FREQUENCY | NUMBER OF CPU CORES | MEMORY CAPACITY | NETWORK BANDWIDTH |
| 1 | 3.1GHz | 16 | 256GiB | 10Gbps |
| 2 | 3.1GHz | 32 | 256GiB | 10Gbps |
| 3 | 3.1GHz | 32 | 256GiB | 20Gbps |
| 4 | 3.1GHz | 64 | 512GiB | 10Gbps |
| ... | ... | ... | ... | ... |

FIG. 11

COUNTERMEASURE EXECUTION MANAGEMENT TABLE 3600

| COUNTERMEASURE EXECUTION ID 3601 | NODE ID 3602 | CHANGED INSTANCE TYPE ID 3603 | CHANGE TRIGGER 3604 | COUNTERMEASURE EXECUTION COMPLETION 3605 |
|---|---|---|---|---|
| 1 | 1 | 5 | 2021/4/5 00:00:00 | False |
| 2 | 2 | 5 | 2021/4/5 00:00:00 | False |
| ... | ... | ... | ... | ... |

STORAGE MANAGEMENT SYSTEM AND STORAGE MANAGEMENT METHOD

CROSS-REFERENCE TO RELATED APPLICATION

The present application claims priority from Japanese application JP2021-208703, filed on Dec. 22, 2021, the contents of which is hereby incorporated by reference into this application.

BACKGROUND OF THE INVENTION

1. Field of the Invention

The present invention relates to a technique of managing an instance, which controls access to a storage device, in a storage node constituting a storage system.

2. Description of the Related Art

The number of users who use a public cloud is increasing in order to reduce capital expenditure (Capex). A storage vendor has developed, in response to such a trend, a storage system that can operate in a public cloud in order to implement a hybrid cloud. In the cloud, it is easy to dynamically allocate and change resources, and there is a possibility that the storage system can efficiently operate at a low cost.

As a technique of improving performance of a storage system, for example, JP-A-2019-101703 discloses a technique (scale-out technique) of improving performance of a storage system by adding storage nodes to the storage system and reducing a load on each storage node.

For example, in a case of using the scale-out technique, in order to solve a performance problem in the storage system, there is a flow of detecting a bottleneck in the storage system and taking a countermeasure of adding a node.

For example, when a CPU of the storage system is a bottleneck, a flow of countermeasures of adding a node and moving a volume from an overloaded node to the added node is required. Since it takes a long time to move the volume, elimination of the performance bottleneck is time-consuming, resulting in performance deterioration of the storage system during that time.

When adding the node, even though the CPU is the bottleneck, not only the CPU but also other resources such as a memory and a network that are not related to the bottleneck will be added, resulting in low resource utilization. Such a problem also occurs when resources other than the CPU become a bottleneck.

When taking a countermeasure to eliminate the performance bottleneck, it is necessary to consider a plan for actually performing node addition, volume movement, and the like, which causes a complicated problem in terms of storage system operation.

SUMMARY OF THE INVENTION

The invention has been made in view of the above circumstances, and an object thereof is to provide a technique capable of quickly and appropriately adjusting performance of a storage system.

In order to achieve the above object, a storage management system according to an aspect of the present invention includes: a storage system including a plurality of storage nodes; and a management device. The storage node includes a storage device and an instance to which a resource is virtually allocated and that controls access to the storage device. The storage management system further includes an instance management node configured to manage the instance of the storage node. The management device is configured to determine whether a configuration of the resource allocated to the instance of the storage node needs to be changed, and cause the instance management node to change the configuration of the resource allocated to the instance when the configuration of the resource needs to be changed.

According to the invention, it is possible to quickly and appropriately adjust performance of the storage system.

BRIEF DESCRIPTION OF THE DRAWINGS

FIG. 6 is a configuration diagram of an instance management table according to the embodiment.

FIG. 7 is a configuration diagram of an operation information management table according to the embodiment.

FIG. 8 is a configuration diagram of a host I/O management table according to the embodiment.

FIG. 9 is a configuration diagram of a performance bottleneck management table according to the embodiment.

FIG. 10 is a configuration diagram of an instance type management table according to the embodiment.

FIG. 11 is a configuration diagram of a countermeasure execution management table according to the embodiment.

DESCRIPTION OF THE PREFERRED EMBODIMENTS

An embodiment will be described with reference to the drawings. The embodiments described below do not limit the invention according to the claims, and all elements and combinations thereof described in the embodiments are not necessarily essential to the solution of the invention.

In the following description, information may be described by an expression of "AAA table", and the information may be expressed by any data structure. That is, in order to indicate that the information does not depend on the data structure, the "AAA table" may be referred to as "AAA information".

In the following description, processing may be described with a program as a subject of an operation. The program is executed by a processor (for example, a CPU) to execute predetermined processing while appropriately using a storage resource (for example, a memory) and/or a communication interface device (for example, a network interface card (NIC)). Therefore, the processor may serve as a subject of the processing. The processing described with the program as the subject of the operation may be processing executed by a processor or a computer (system) including the processor.

Two or more programs may be implemented as one program, or one program may be implemented as two or more programs in the following description.

In the following description, an "instance" refers to a virtual computer constituted by software using resources on one or more physical computers, and may be configured on a public cloud or on a private cloud.

In the following description, an "instance type" is determined by a combination of specification values of resources such as a CPU frequency, the number of cores, a memory speed, a memory capacity, and a network interface (I/F) bandwidth, and refers to a type of configuration of the instance. The specification value may be a CPU frequency, the number of cores, a memory speed, a memory capacity, a network I/F bandwidth, or any other value.

Figure 1:
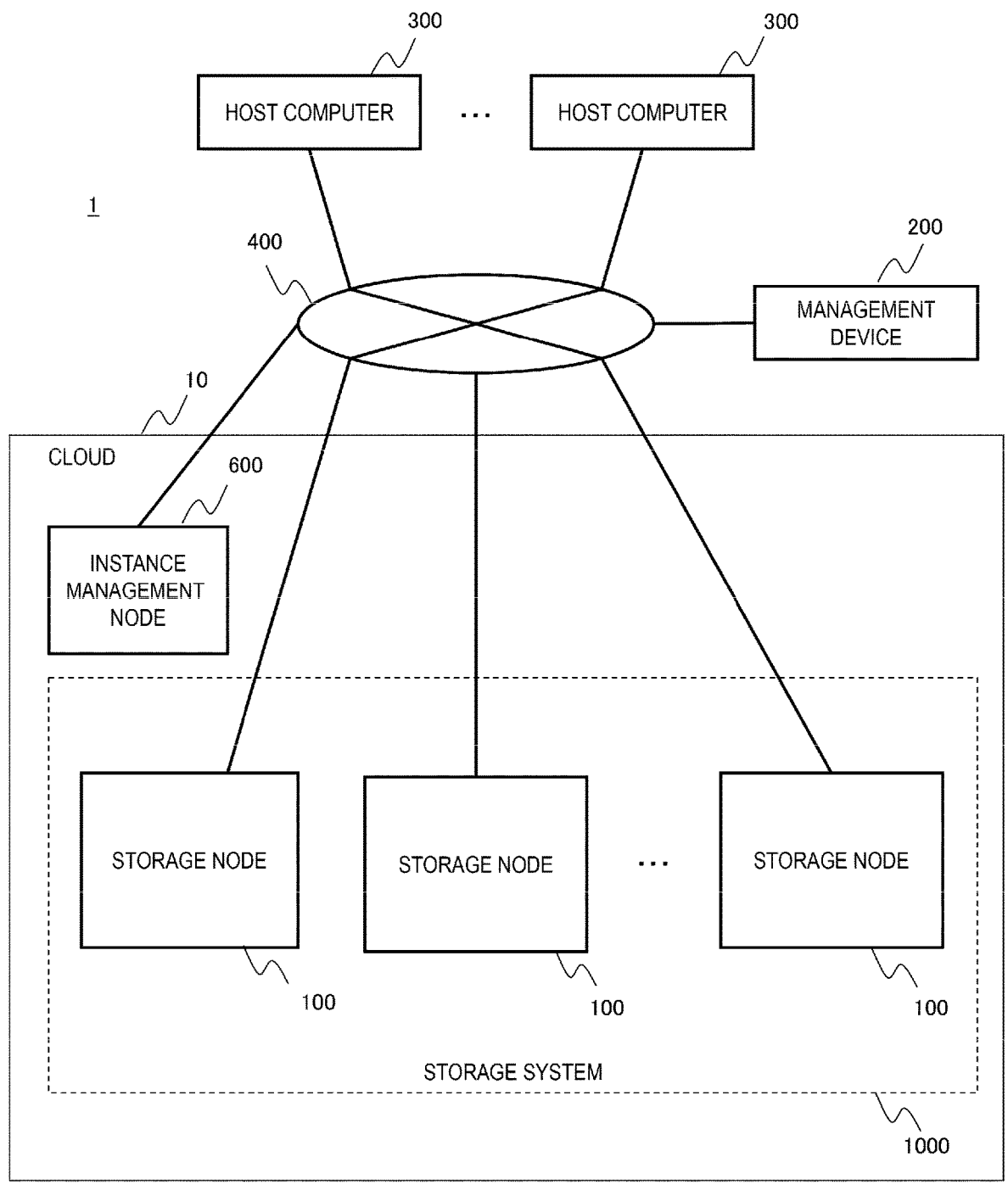
FIG. 1 is an overall configuration diagram of a storage management system according to an embodiment.

FIG. 1 is an overall configuration diagram of a storage management system according to an embodiment.

A storage management system 1 includes a storage system 1000, a management device 200, one or more host computers 300, and an instance management node 600. The storage system 1000 includes one or more storage nodes 100. In the present embodiment, the instance management node 600 and the storage system 1000 are provided in a cloud 10, and are constituted by one or more physical computers of the cloud 10.

The storage node 100, the management device 200, the host computer 300, and the instance management node 600 are connected via a network 400. The network 400 may be, for example, a local area network (LAN) or a wide area network (WAN).

The host computer 300 includes, for example, a computer or a file server serving as a core of a business system, and requests the storage system 1000 to read/write. The host computer 300 may be a physical computer or a virtual computer. In the host computer 300, for example, when a plurality of storage nodes 100 constitute a cluster, a multipath is set between the host computer 300 and the storage nodes constituting the cluster. For example, when Linux (registered trademark) is used, multipath-tools can be used for setting the multipath, and when the host computer 300 is Windows (registered trademark) server, MPIO service can be used.

The management device 200 is, for example, a computer including hardware resources such as a CPU, a memory, and a network I/F, and software resources such as a management program. The management device 200 may be a physical computer or a virtual computer. The management device 200 acquires information from the storage system 1000 by the management program, and displays the information via a user interface (graphic user interface (GUI), command line interface (CLI)). The management device 200 has a function of transmitting an instruction, which is received from a system administrator, to the storage system 1000 via the user interface. The management device 200 may be an on-premises device or an on-cloud device.

The instance management node 600 is a node that manages instances in the cloud 10.

The storage node 100 manages user data used by the host computer 300.

Figure 2:
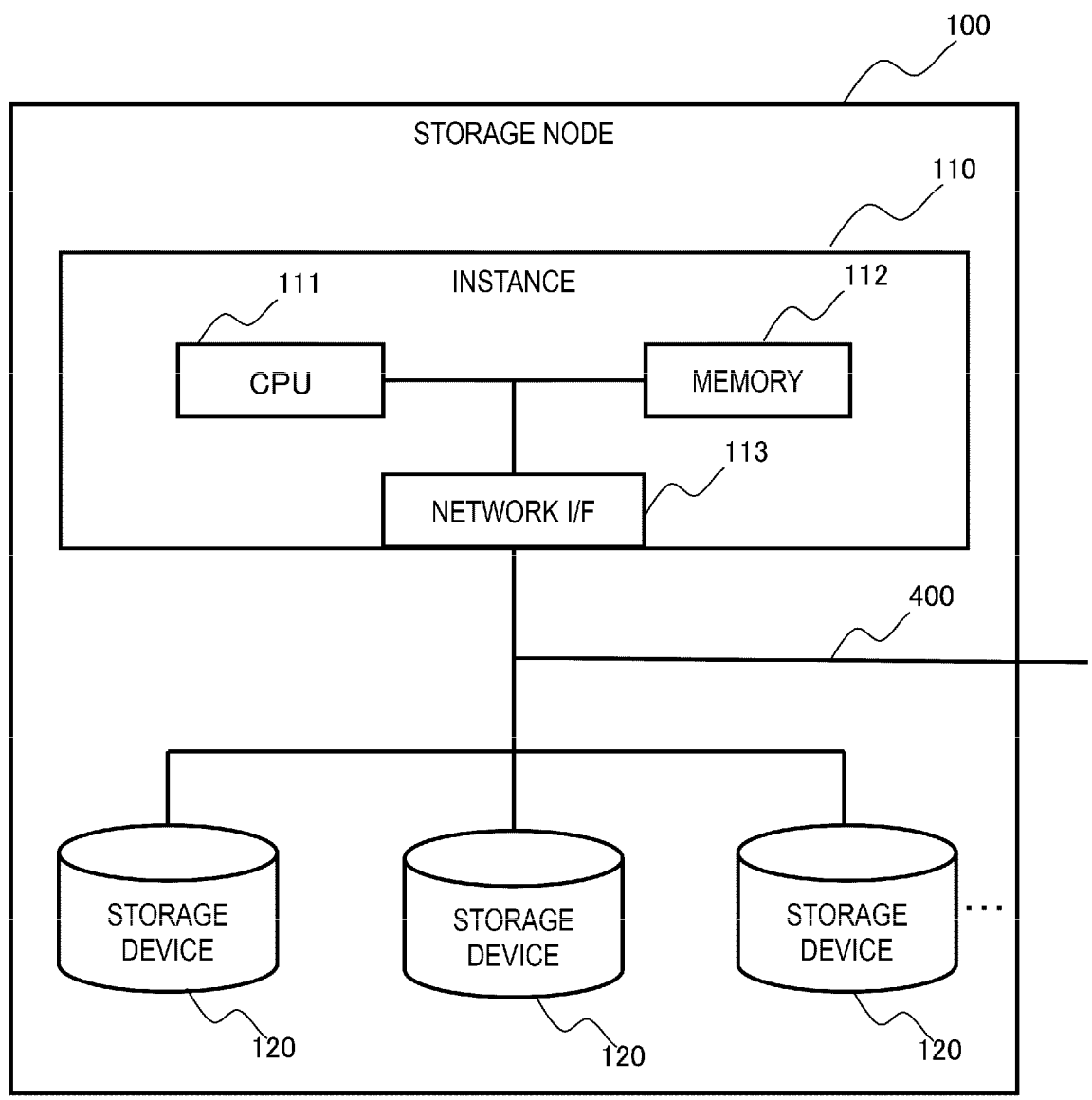
FIG. 2 is a configuration diagram of a storage node according to the embodiment.

Next, the storage node 100 will be described in detail. FIG. 2 is a configuration diagram of the storage node according to the embodiment.

The storage node 100 includes one or more instances 110 and one or more storage devices 120.

The instance 110 is a virtual computer constituted by software using resources on a physical computer of the cloud 10. The instance 110 may be a virtual machine.

The instance 110 includes a CPU 111, a memory 112, and a network I/F 113. A resource amount of the CPU 111, the memory 112, or the network I/F 113 in the instance 110 is a resource amount corresponding to a predetermined instance type. The CPU 111 is a virtual CPU to which a physical CPU of the physical computer of the cloud 10 is virtually allocated. The CPU 111 executes processing such as access control to the storage device 120 based on a program and management information stored in the memory 112. The memory 112 is a virtual memory to which a physical memory of the physical computer of the cloud 10 is virtually allocated. The memory 112 stores the program executed by the CPU 111 and the management information referred to or updated by the CPU 111. The network I/F 113 is an I/F for communicating with the storage device 120, other storage nodes 100, the management device 200, the host computer 300, and the instance management node 600 via the network 400.

The storage device 120 is a physical or virtual storage device, and typically may be a nonvolatile storage device. The storage device 120 may be, for example, a hard disk drive (HDD) or a solid state drive (SSD). The storage device 120 stores user data used by the host computer 300.

Next, the management device 200 will be described in detail.

Figure 3:
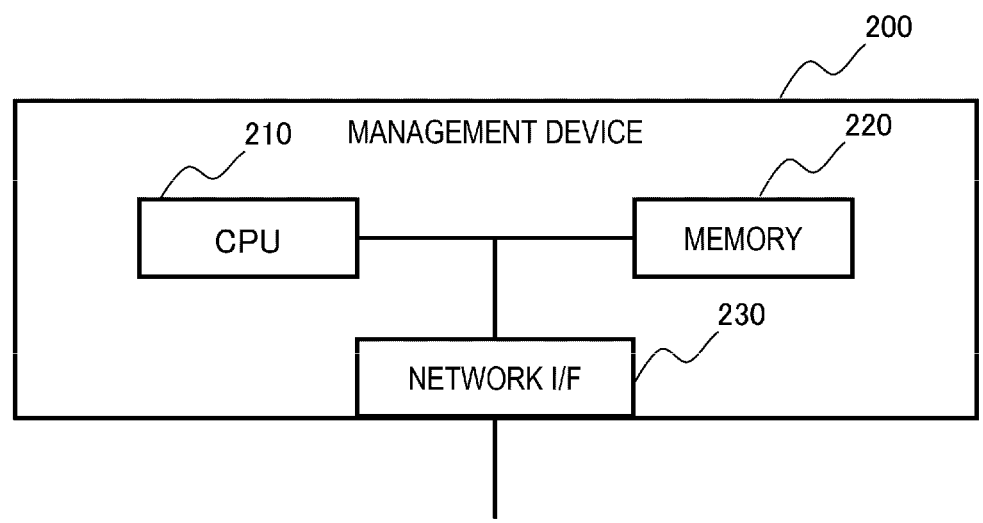
FIG. 3 is a configuration diagram of a management device according to the embodiment.

FIG. 3 is a configuration diagram of the management device according to the embodiment.

The management device 200 includes a CPU 210, a memory 220, and a network I/F 230. The CPU 210 executes processing of controlling all the storage nodes 100 and the entire storage system 1000 based on a program and management information stored in the memory 220. The memory 220 stores the program executed by the CPU 210 and the management information referred to or updated by the CPU 210. The network I/F 230 is an I/F for communicating with the storage node 100, the host computer 300, and the instance management node 600 via the network 400.

Next, an outline of processing of the storage management system 1 will be described.

Figure 4:
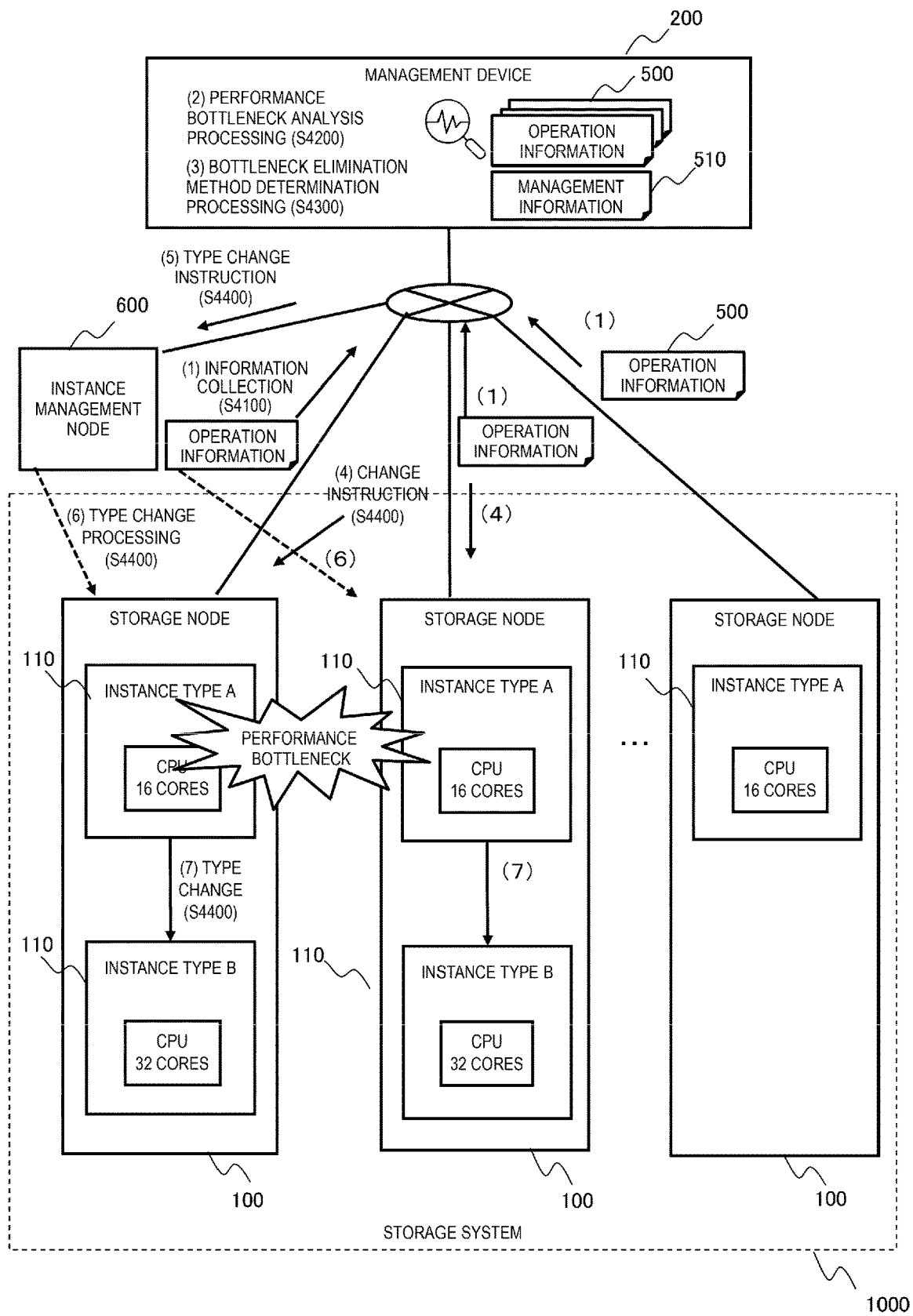
FIG. 4 is a diagram showing an outline of processing of the storage management system according to the embodiment.

FIG. 4 is a diagram showing an outline of processing of the storage management system according to the embodiment.

The management device 200 of the storage management system 1 executes processing of collecting operation information 500 from the storage nodes 100 (information collection processing: S4100) ((1) in FIG. 4). Here, the operation information 500 is information necessary for grasping performance of the storage system 1000 and a usage status of the storage system, such as I/O information (I/O response time, I/O throughput) from the host computer 300 to the storage system 1000 and a hardware operation rate (a CPU operation rate, a memory usage amount, a network usage bandwidth) of each storage node 100. The operation information 500 is periodically recorded in the storage node 100, and is stored in the memory 112 of the instance 110 of the storage node 100 or in the storage device 120 with which the instance 110 can communicate.

In (1) in FIG. 4, the management device 200 may collect the operation information 500 from the storage node 100 by issuing an information collection request to the storage node 100, or the management device 200 may collect the operation information 500 by the storage node 100 periodically and spontaneously transmitting the operation information 500 to the management device 200.

The management device 200 stores the collected operation information 500 in the memory 220. The management device 200 may store the collected operation information 500 in a connected nonvolatile storage device.

Next, the management device 200 monitors and analyzes the operation information 500 to detect a performance problem in the storage system 1000. When the performance problem is detected, the management device 200 analyzes the operation information 500 and management information 510 to execute processing (performance bottleneck analysis processing: step S4200) of detecting a portion that is a performance bottleneck (performance bottleneck portion) in the storage system 1000 ((2) in FIG. 4). The management information 510 is setting information for the storage system 1000 and the storage node 100, and static information necessary for performance analysis. The management information 510 is also information on a current instance type set for the instance 110, logical configuration information on a volume configuration of the storage system 1000, whether a compression/deduplication function is applied, and the like, and target I/O performance information for current specifications of the storage system 1000. In the performance bottleneck analysis processing in (2) in FIG. 4, the management device 200 detects which resource (CPU, memory, network I/F) in the instance 110 of the storage node 100 is insufficient, that is, where the performance bottleneck portion is located.

Next, the management device 200 executes processing (bottleneck elimination method determination processing: S4300) of determining a method for eliminating the performance bottleneck for the detected performance bottleneck portion ((3) in FIG. 4). For example, when the management device 200 determines that target I/O performance (reference value) of the storage system 1000 has not been achieved because a specification of the CPU 111 of the instance 110 of a certain storage node 100 is insufficient, the management device 200 determines an instance type capable of improving the specification of the CPU 111 as the changed instance type. The management device 200 determines a trigger (type change trigger) for changing the instance type for eliminating the performance bottleneck. For example, in order to reduce an influence on I/O of the host computer 300, the management device 200 determines a midnight time zone when the number of I/Os is small as the type change trigger.

Next, the management device 200 transmits a type change instruction to the storage node 100 whose instance type is to be changed ((4) in FIG. 4), and executes processing (countermeasure execution processing: step S4400) for transmitting the type change instruction to the instance management node 600 ((5) in FIG. 4). The type change instruction may instruct the storage node 100 to transition to a state in which the instance type is changeable and then instructs the storage node 100 to transition to a steady operation state after a change of the instance type. Here, the state in which the instance type is changeable may be a state in which the storage node 100 is closed for maintenance or a state in which the storage node 100 is stopped. The instruction for allowing the storage node 100 to transition to the steady operation state may be a maintenance recovery instruction or a node start-up instruction.

When there are two or more storage nodes 100 each including an instance whose type is to be changed, the management device 200 may execute type change processing for each storage node in order to maintain redundancy of the storage system 1000. In order to execute the change processing for each storage node, an instance type change instruction for another storage node 100 is waited until execution of processing of changing an instance type for a certain storage node 100 is normally completed. Then, when the instance type change processing for all the change target storage nodes 100 is completed, the countermeasure execution processing is ended.

Next, a configuration of the memory 220 of the management device 200 will be described.

Figure 5:
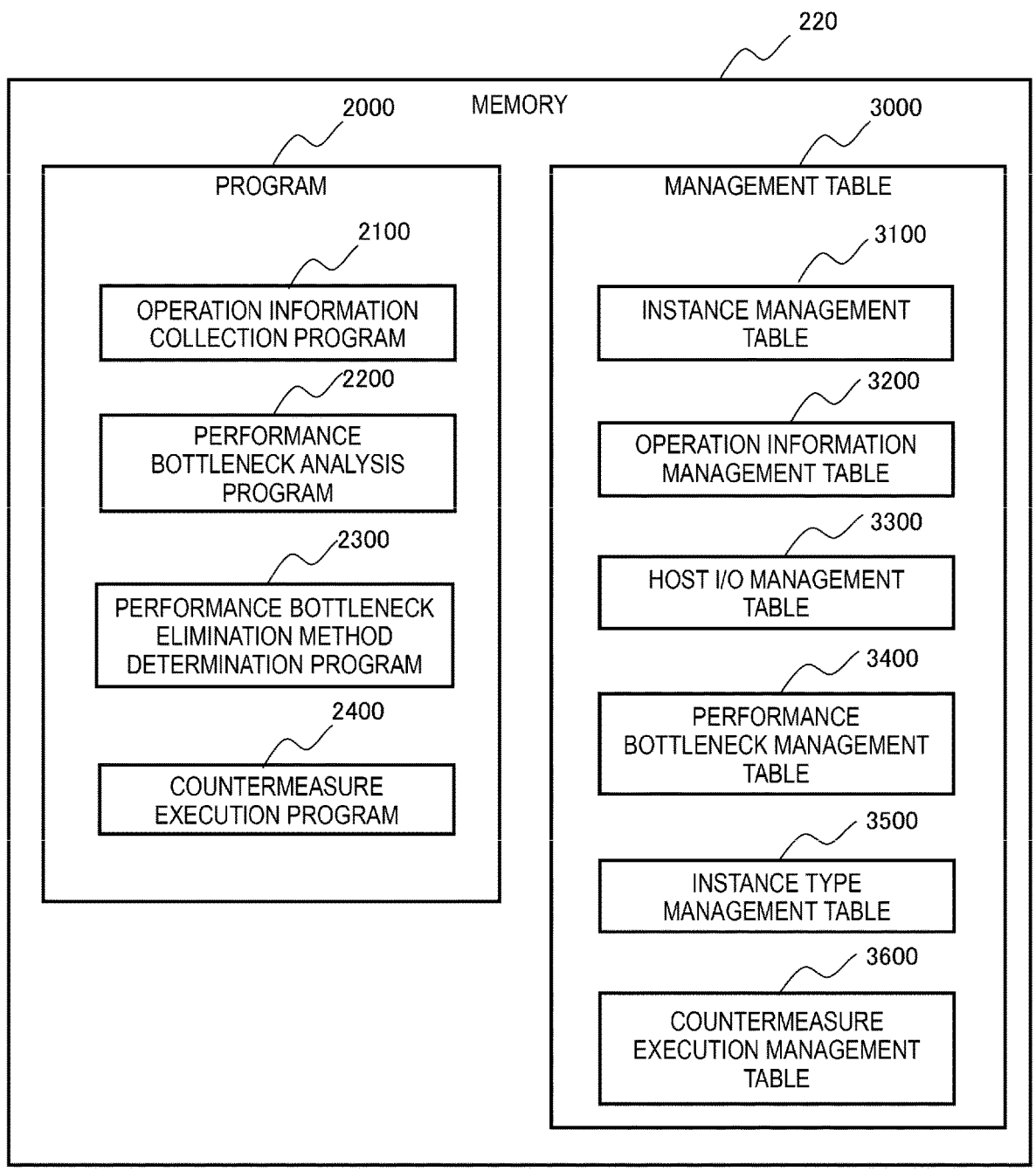
FIG. 5 is a configuration diagram of a memory of the management device according to the embodiment.

FIG. 5 is a configuration diagram of the memory of the management device according to the embodiment.

The memory 220 of the management device 200 stores a program 2000 and a management table 3000.

The program 2000 includes an operation information collection program 2100, a performance bottleneck analysis program 2200, a performance bottleneck elimination method determination program 2300, and a countermeasure execution program 2400.

The management table 3000 includes an instance management table 3100, an operation information management table 3200, a host I/O management table 3300, a performance bottleneck management table 3400, an instance type management table 3500, and a countermeasure execution management table 3600.

The operation information collection program 2100 collects the operation information 500 from the storage node 100, and records data into the operation information management table 3200 and the host I/O management table 3300.

The performance bottleneck analysis program 2200 analyzes the host I/O management table 3300 to detect occurrence of a performance problem, and analyzes the operation information management table 3200 to detect a performance bottleneck portion. The performance bottleneck analysis program 2200 records information on the performance bottleneck portion obtained by the analysis into the performance bottleneck management table 3400.

Based on the information of the performance bottleneck management table 3400, the performance bottleneck elimination method determination program 2300 determines which storage node 100 is to be changed in order to eliminate a performance bottleneck, which instance type the instance 110 of the storage node 100 is to be changed to, and which timing the change is to be made in order to minimize an influence on host I/O, and records the determined information into the countermeasure execution management table 3600. When determining which instance type the storage node 100 is to be changed to, the performance bottleneck elimination method determination program 2300 selects an instance type having sufficient specifications for a resource that is a performance bottleneck in order to eliminate the performance bottleneck with reference to the instance type management table 3500.

Based on the information of the countermeasure execution management table 3600, the countermeasure execution program 2400 transmits an instance type change instruction to the storage node 100 and transmits the instance type change instruction to the instance management node 600 at a predetermined change trigger.

Next, the instance management table 3100 will be described.

FIG. 6 is a configuration diagram of the instance management table according to the embodiment.

The instance management table 3100 is a table for managing information on the instance 110 in the storage node 100 of the storage system 1000. The instance management table 3100 stores an entry for each instance 110 of the storage system 1000. The entry of the instance management table 3100 includes fields of a node ID 3101, a CPU frequency 3102, the number of CPU cores 3103, a memory capacity 3104, and a network bandwidth 3105.

The node ID 3101 stores an identification number (node ID) of the storage node 100 having the instance 110 corresponding to the entry. The CPU frequency 3102 stores a frequency of the CPU 111 allocated to the instance 110 corresponding to the entry. The number of CPU cores 3103 stores the number of cores of the CPU 111 allocated to the instance 110 corresponding to the entry. The memory capacity 3104 stores a capacity of the memory allocated to the instance 110 corresponding to the entry. The network bandwidth 3105 stores a bandwidth of the network I/F 113 allocated to the instance 110 corresponding to the entry.

Next, the operation information management table 3200 will be described.

FIG. 7 is a configuration diagram of the operation information management table according to the embodiment.

The operation information management table 3200 is a table for managing information on an operation state of the storage node 100, and stores an entry for each storage node 100. The entry of the operation information management table 3200 includes fields of a node ID 3201, an information collection time point 3202, a CPU operation rate 3203, a memory usage amount 3204, and a network usage bandwidth 3205.

The node ID 3201 stores an identification number (node ID) of the storage node 100 corresponding to the entry. The information collection time point 3202 stores a time point (date and time) when information corresponding to the entry is collected from the storage node 100 and stored. The CPU operation rate 3203 stores an operation rate indicating a magnitude of a load of the CPU 111 in the storage node 100 corresponding to the entry. The memory usage amount 3204 stores a usage amount (memory usage amount) of the memory 112 in the storage node 100 corresponding to the entry. The network usage bandwidth 3205 stores a network bandwidth used by the network I/F 113 of the storage node 100 corresponding to the entry (network usage bandwidth).

Next, the host I/O management table 3300 will be described.

FIG. 8 is a configuration diagram of the host I/O management table according to the embodiment.

The host I/O management table 3300 is a table for managing I/O information by the host computer 300 with respect to the storage system 1000, and stores an entry for each time point when the I/O information is acquired. The entry of the host I/O management table 3300 includes fields of an information collection time point 3301, an IOPS 3302, and a transfer rate 3303. The information collection time point 3301 stores a time point when information corresponding to the entry is acquired and stored (information acquisition time point). The IOPS 3302 stores the number of I/Os per time unit (IOPS: input/output per second) with respect to the storage system 1000. The transfer rate 3303 stores an amount of data transferred per time unit (transfer rate) to the storage system 1000.

Next, the performance bottleneck management table 3400 will be described.

FIG. 9 is a configuration diagram of the performance bottleneck management table according to the embodiment.

The performance bottleneck management table 3400 is a table for managing information on performance bottlenecks, and stores an entry for each detected performance bottleneck. The entry of the performance bottleneck management table 3400 includes fields of a bottleneck ID 3401, an information recording time point 3402, a node ID 3403, a performance bottleneck portion 3404, a required resource enhancement ratio 3405, and bottleneck elimination method determination completion 3406.

The bottleneck ID 3401 stores an identification number (bottleneck ID) for uniquely identifying a detected performance bottleneck. The information recording time point 3402 stores a time point when information on the detected performance bottleneck is registered. The node ID 3403 stores a node ID of the storage node 100 having a portion (performance bottleneck portion) that is a performance bottleneck in the performance bottleneck corresponding to the entry. The performance bottleneck portion 3404 stores information indicating a performance bottleneck portion of the storage node 100 in the performance bottleneck corresponding to the entry. The performance bottleneck portion 3404 stores, for example, a CPU, a memory, and a network I/F, which are components (resources) of the instance 110 of the storage node 100. The required resource enhancement ratio 3405 stores a resource ratio required to eliminate the performance bottleneck corresponding to the entry. For example, when the number of CPU cores of the current instance 110 is 16, the performance bottleneck is the CPU, and 32 or more CPU cores are required to eliminate the performance bottleneck, 2 times is stored in the required resource enhancement ratio 3405. The bottleneck elimination method determination completion 3406 stores information indicating whether a method for eliminating the performance bottleneck (performance bottleneck elimination method) corresponding to the entry is determined. For example, when the performance bottleneck elimination method is determined, True is stored in the bottleneck elimination method determination completion 3406.

Next, the instance type management table 3500 will be described.

FIG. 10 is a configuration diagram of the instance type management table according to the embodiment.

The instance type management table 3500 is a table for managing types (instance types) that can be used for instances, and stores an entry for each instance type. The entry of the instance type management table 3500 includes fields of an instance type ID 3501, a CPU frequency 3502, the number of CPU cores 3503, a memory capacity 3504, and a network bandwidth 3505.

The instance type ID 3501 stores an identification number (instance type ID) for uniquely identifying an instance type corresponding to the entry. The CPU frequency 3502 stores a frequency of a CPU allocated by the instance type corresponding to the entry. The number of CPU cores 3503 stores the number of cores of the CPU allocated by the instance type corresponding to the entry. The memory capacity 3504 stores a capacity of a memory (memory capacity) allocated by the instance type corresponding to the entry. The network bandwidth 3505 stores a bandwidth of a network I/F (network bandwidth) allocated by the instance type corresponding to the entry. The instance type of the instance type management table 3500 may include a plurality of instance types in which only a value of one resource (for example, the number of CPU cores) is different.

Next, the countermeasure execution management table 3600 will be described.

FIG. 11 is a configuration diagram of the countermeasure execution management table according to the embodiment.

The countermeasure execution management table 3600 is a table for managing information on countermeasures for performance bottlenecks, and stores an entry for each countermeasure. The entry of the countermeasure execution management table 3600 includes fields of a countermeasure execution ID 3601, a node ID 3602, a changed instance type ID 3603, a change trigger 3604, and countermeasure execution completion 3605.

The countermeasure execution ID 3601 stores an identification number uniquely assigned to a countermeasure corresponding to the entry. The node ID 3602 stores a node ID of the target storage node 100 for which the countermeasure corresponding to the entry is executed. The changed instance type ID 3603 stores an identification number of an instance type (instance type ID) of an instance changed by the countermeasure corresponding to the entry. The change trigger 3604 stores a trigger for changing the instance type of the instance (change trigger) by executing the countermeasure corresponding to the entry. The change trigger may be a specific date and time, may be a specific day of the week, or may be a specific time zone. The countermeasure execution completion 3605 stores whether the execution of the countermeasure corresponding to the entry is completed. In the present embodiment, True is stored in the countermeasure execution completion 3605 when the execution of the countermeasure is completed, and False is stored in the countermeasure execution completion 3605 when the execution of the countermeasure is not completed.

Next, the information collection processing (step S4100) executed by the management device 200 will be described.

Figure 12:
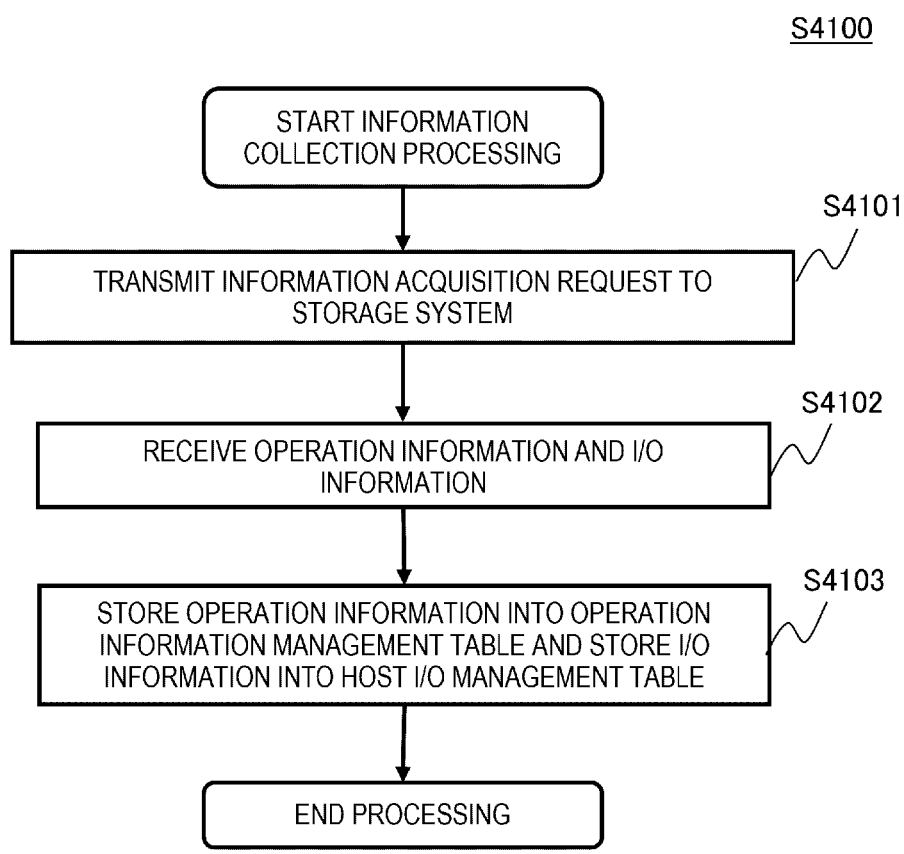
FIG. 12 is a flowchart of information collection processing according to the embodiment.

FIG. 12 is a flowchart of the information collection processing according to the embodiment.

The information collection processing is executed, for example, periodically by the management device 200. An execution cycle of the information collection processing may be, for example, a cycle that is determined based on characteristics of the storage system 1000 and is necessary for detection of a performance problem of the storage system 1000 and analysis of a bottleneck portion.

The operation information collection program 2100 of the management device 200 (strictly speaking, the CPU 210 that executes the operation information collection program 2100) transmits, to the storage system 1000, an information acquisition request for acquiring operation information on the storage node 100 and I/O information from the host computer 300 (step S4101). Here, the information acquisition request may be transmitted to each storage node 100 of the storage system 1000, and the operation information and I/O information may be transmitted from each storage node 100 in response thereto. Alternatively, the information acquisition request may be transmitted to the representative storage node 100 of the storage system 1000, the operation information and the I/O information on each storage node 100 may be acquired by the representative storage node 100, and the summarized information may be transmitted.

Next, the operation information collection program 2100 receives the operation information and I/O information transmitted from the storage system 1000 (step S4102). The operation information and I/O information may be received by communication of one time or may be received by communication of a plurality of times.

Next, the operation information collection program 2100 stores the received operation information and I/O information into the management table 3000 (step S4103). Specifically, the operation information collection program 2100 stores the operation information (for example, a CPU operation rate, a memory usage amount, and a network usage bandwidth) into the operation information management table 3200, and stores the I/O information into the host I/O management table 3300.

Next, the performance bottleneck analysis processing (step S4200) executed by the management device 200 will be described.

Figure 13:
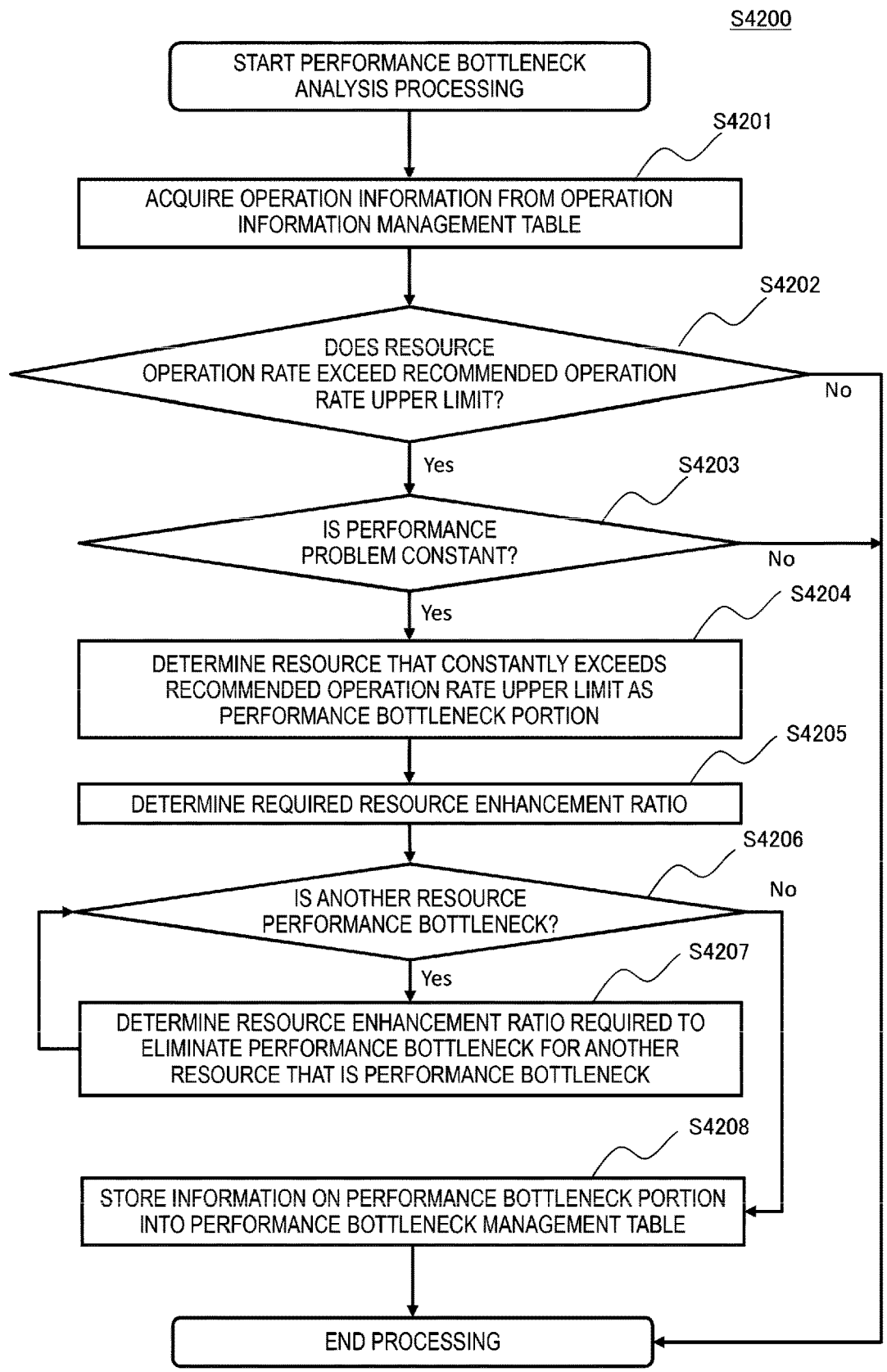
FIG. 13 is a flowchart of performance bottleneck analysis processing according to the embodiment.

FIG. 13 is a flowchart of the performance bottleneck analysis processing according to the embodiment.

The performance bottleneck analysis processing is, for example, periodically executed by the management device 200. An execution cycle of the performance bottleneck analysis processing may be, for example, a cycle that is determined based on the characteristics of the storage system 1000 and is necessary for the detection of the performance problem of the storage system 1000 and the analysis of the bottleneck portion.

The performance bottleneck analysis program 2200 of the management device 200 (strictly speaking, the CPU 210 that executes the performance bottleneck analysis program 2200) acquires the operation information on each storage node 100 of the storage system 1000 from the operation information management table 3200 (step S4201). Here, a plurality of pieces of acquired operation information may be aggregated for each storage node 100, such as averaging values in a certain period of time.

Next, the performance bottleneck analysis program 2200 determines whether an operation rate (usage rate: operation performance) of a resource of the instance 110 of the storage node 100 exceeds an upper limit of a recommended operation rate (reference value) based on the acquired operation information (step S4202). The processing of steps S4202 to S4208 may be executed by setting each of the operation rate of each resource and the usage rate of the resource included in the operation information as a determination target. The upper limit of the recommended operation rate of each resource may be managed by a table, or may be managed by another data structure. The upper limits of these recommended operation rates may be stored in advance when the storage system 1000 is started up, and may be referred to in the performance bottleneck analysis processing.

As a result, when it is determined that the operation rate (usage rate) of the resource does not exceed the upper limit of the recommended operation rate (usage rate) (step S4202: No), it means that there is no portion that is a performance bottleneck in the storage system 1000, and thus the performance bottleneck analysis program 2200 ends the performance bottleneck analysis processing.

On the other hand, when it is determined that the operation rate (usage rate) of the resource exceeds the upper limit of the recommended predetermined operation rate (usage rate) (step S4202: Yes), it means that a portion (resource) to be determined in the storage system 1000 is a performance bottleneck, and thus the performance bottleneck analysis program 2200 determines whether a performance problem is constant, that is, whether it is constant that the operation rate (usage rate) of the resource exceeds the upper limit of the recommended predetermined operation rate (usage rate) (step S4203). Here, whether the performance problem is constant can be determined with reference to the past operation information in the operation information management table 3200. Whether the performance problem is constant may be determined based on, for example, information indicating how long the performance problem has continued, and a threshold of a period for determining that the performance problem is constant may be determined based on the characteristics of the storage system 1000.

As a result, when it is determined that the performance problem is not constant (step S4203: No), it is considered that the performance problem is a temporary performance problem and does not need to be handled, and thus the performance bottleneck analysis program 2200 ends the performance bottleneck analysis processing.

On the other hand, when it is determined that the performance problem is constant (step S4203: Yes), the performance bottleneck analysis program 2200 determines a resource of the storage node 100 that constantly exceeds the upper limit of the recommended operation rate as a performance bottleneck portion (step S4204). Here, the resource of the storage node 100 determined as the performance bottleneck portion includes, for example, the CPU 111, the memory 112, or the network I/F 113 of the instance 110.

Next, the performance bottleneck analysis program 2200 determines a resource enhancement ratio (enhanced resource amount) required to eliminate a performance bottleneck in the determined performance bottleneck portion (step S4205). For example, the resource enhancement ratio required to eliminate the performance bottleneck may be determined based on the operation information management table 3200 and the recommended operation rate. For example, when a current CPU operation rate is 70% and a recommended CPU operation rate is 50%, if a resource, namely the CPU is multiplied by 1.4 times, the CPU operation rate becomes 50% and the performance bottleneck can be eliminated. Therefore, an enhanced resource amount may be 1.4 times, or may exceed 1.4 times and be the lowest possible magnification (for example, 2 times) in consideration of a possible magnification as an instance type. For example, when the number of CPU cores of the current instance 110 is 16, the performance bottleneck is the CPU, and 32 or more CPU cores are required to eliminate the performance bottleneck, the resource enhancement ratio required to eliminate the bottleneck is 2 times.

Next, the performance bottleneck analysis program 2200 performs resource enhancement on the performance bottleneck portion at the resource enhancement ratio determined in step S4205, and when the performance bottleneck is eliminated, determines whether another resource is a performance bottleneck (step S4206). Here, another resource may be another resource in the instance 110 the same as the instance 110 in which the performance bottleneck portion determined in step S4204 is present, or may be a resource of the storage node 100 different from the storage node 100 in which the performance bottleneck portion is present. When detecting another performance bottleneck portion, it may be detected based on information such as a volume configuration and function setting of the storage system 1000, and an amount of communication between the storage nodes 100.

For example, when the performance bottleneck in the CPU of a certain storage node 100 is eliminated, an amount of processing executed by the CPU of the storage node 100 increases. In this case, since the processing executed by the CPU also includes communication with other storage nodes, a usage amount of a network bandwidth increases. Since a cluster is constituted by a plurality of storage nodes and a cooperative operation is performed by the plurality of storage nodes, operation rates of the CPUs of other storage nodes also increase. In consideration of such a situation, for example, when the performance bottleneck in the CPU of the certain storage node is eliminated, if a network bandwidth of the storage node is equal to or greater than a predetermined threshold, it may be determined that the network bandwidth is a performance bottleneck, and if a CPU operation rate of another storage node is equal to or greater than a predetermined threshold, it may be determined that the CPU of another storage node is a performance bottleneck.

As a result, when another resource is a performance bottleneck (step S4206: Yes), the performance bottleneck analysis program 2200 determines a resource enhancement ratio required to eliminate the performance bottleneck for another resource that is the performance bottleneck (step S4207), and advances the processing to step S4206. A method for determining the resource enhancement ratio required to eliminate the performance bottleneck may be the same method as in step S4205.

On the other hand, when another resource is not a performance bottleneck (step S4206: No), the performance bottleneck analysis program 2200 stores information on a performance bottleneck portion into the performance bottleneck management table 3400 (step S4208), and ends the processing. Specifically, the performance bottleneck analysis program 2200 stores, into the performance bottleneck management table 3400, information on the performance bottleneck portion such as the performance bottleneck portions detected in steps S4204 and S4206 and the required resource enhancement ratios determined in steps S4205 and S4207.

According to the performance bottleneck analysis processing, it is possible to detect the performance bottleneck portion in the instance 110 in the storage system 1000, and it is possible to appropriately detect the resource required to eliminate the performance bottleneck in the performance bottleneck portion.

Next, the performance bottleneck elimination method determination processing (step S4300) executed by the management device 200 will be described.

Figure 14:
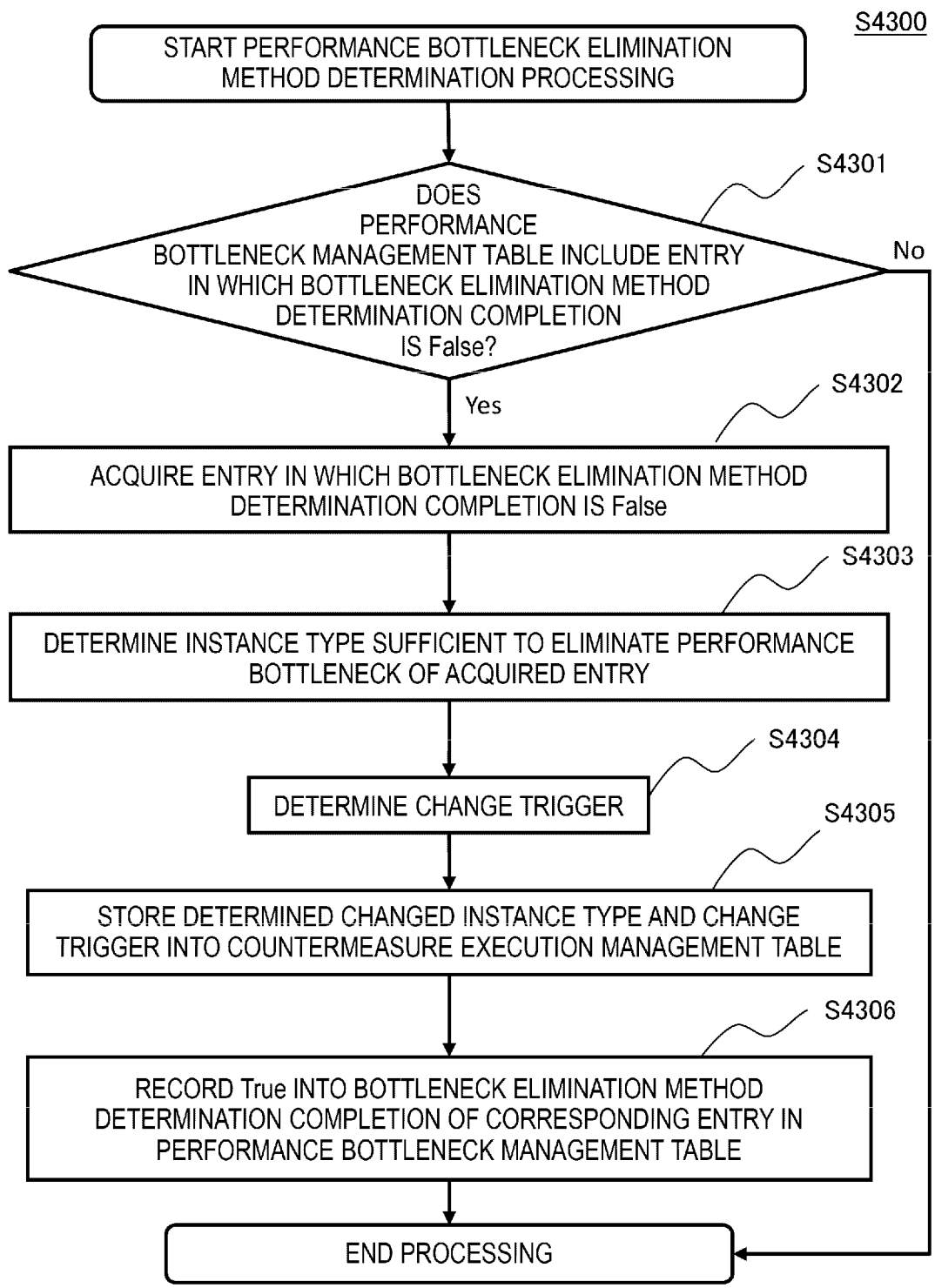
FIG. 14 is a flowchart of performance bottleneck elimination method determination processing according to the embodiment.

FIG. 14 is a flowchart of the performance bottleneck elimination method determination processing according to the embodiment.

The performance bottleneck elimination method determination processing is executed, for example, periodically or immediately after the performance bottleneck analysis processing (step S4200) is ended.

The performance bottleneck elimination method determination program 2300 of the management device 200 (strictly speaking, the CPU 210 that executes the performance bottleneck elimination method determination program 2300) determines whether the performance bottleneck management table 3400 includes an entry of a performance bottleneck for which a bottleneck elimination method is not determined, that is, for which the bottleneck elimination method determination completion 3406 is False (step S4301).

As a result, when no corresponding entry is present (step S4301: No), the performance bottleneck elimination method determination program 2300 ends the performance bottleneck elimination method determination processing, whereas when a corresponding entry is present (step S4301: Yes), the performance bottleneck elimination method determination program 2300 acquires the corresponding entry from the performance bottleneck management table 3400 (step S4302).

Next, the performance bottleneck elimination method determination program 2300 determines an instance type including a resource sufficient to eliminate a performance bottleneck of the acquired entry based on information of the acquired entry, information of the instance management table 3100, and information of the instance type management table 3500 (step S4303). In the present embodiment, the performance bottleneck elimination method determination program 2300 determines an instance type in which a resource that is a performance bottleneck is set to a resource amount at which the performance bottleneck is to be eliminated, and other resources are not changed from before the change or increased by a smallest resource amount. Accordingly, it is possible to appropriately prevent the resource not related to the performance bottleneck from being allocated to the instance uselessly.

Next, the performance bottleneck elimination method determination program 2300 determines a trigger (change trigger) for changing the instance type to the determined instance type (step S4304). In order to minimize an influence on the host I/O, the change trigger may be a time zone or a day of the week in which the number of host I/Os is small, or may be a timing of a maintenance operation planned in advance. When the time zone or the day of the week in which the number of the host I/Os is small is selected as the change trigger, for example, the performance bottleneck elimination method determination program 2300 analyzes information of the host I/O management table 3300 and finds periodicity of the host I/O, thereby selecting the time zone or the day of the week in which the number of host I/Os is small as the trigger.

The performance bottleneck elimination method determination program 2300 stores, into the countermeasure execution management table 3600, an entry including a node ID of a node in which a performance bottleneck was present, the determined instance type changed for eliminating the performance bottleneck, and the determined change trigger (step S4305).

Next, the performance bottleneck elimination method determination program 2300 records True, indicating that the performance bottleneck elimination method is determined, into the bottleneck elimination method determination completion 3406 of the corresponding entry in the performance bottleneck management table 3400 (step S4306), and ends the processing.

According to the performance bottleneck elimination method processing described above, it is possible to determine the instance type including the resource required to eliminate the performance bottleneck, and to determine an appropriate change trigger.

Next, the countermeasure execution processing (step S4400) executed by the management device 200 will be described.

Figure 15:
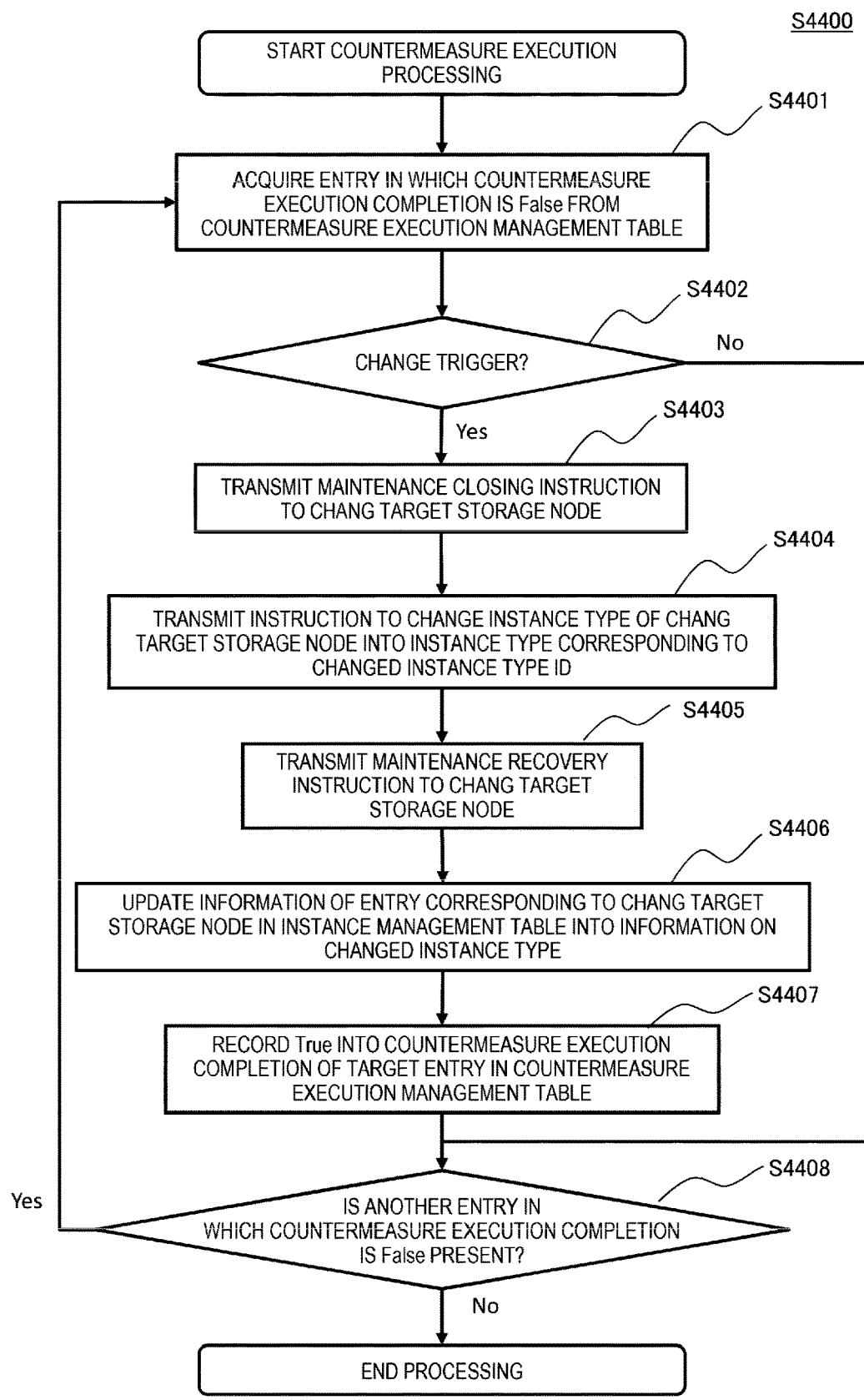
FIG. 15 is a flowchart of countermeasure execution processing according to the embodiment.

FIG. 15 is a flowchart of the countermeasure execution processing according to the embodiment.

The countermeasure execution processing is executed, for example, periodically. The countermeasure execution program 2400 (strictly speaking, the CPU 210 that executes the countermeasure execution program 2400) acquires an entry of a countermeasure that is not executed, that is, an entry in which the countermeasure execution completion 3605 is False, from the countermeasure execution management table 3600 (step S4401).

The countermeasure execution program 2400 determines whether a change trigger of the acquired entry (target entry) is satisfied (step S4402). As a result, when the change trigger of the target entry is not satisfied (step S4402: No), the countermeasure execution program 2400 advances the processing to step S4408.

On the other hand, when the change trigger of the target entry is satisfied (step S4402: Yes), the countermeasure execution program 2400 transmits a closing instruction for maintenance (maintenance closing instruction) of the change target storage node 100 corresponding to the target entry, that is, the storage node 100 having the node ID, namely the node ID 3602 in the target entry, to the predetermined storage node 100 (for example, the storage node 100 serving as a representative of the cluster) (step S4403). As a result, the storage node 100 that has received the maintenance closing instruction executes maintenance closing processing (see FIG. 17). After the maintenance closing instruction is issued, the countermeasure execution program 2400 waits until the maintenance closing processing of the storage node 100 is completed.

Next, after the maintenance closing processing of the storage node 100 is completed, the countermeasure execution program 2400 transmits, to the instance management node 600, an instruction (change instruction) to change an instance of a change target storage node into an instance type corresponding to the changed instance type ID 3603 in the acquired entry (step S4404). Accordingly, the instance management node 600 can change the instance of the change target storage node into the changed instance type, and can eliminate the performance bottleneck. After the change instruction is issued, the countermeasure execution program 2400 waits until the instance type of the instance 110 of the storage node 100 is changed.

Next, after the instance type of the instance 110 of the storage node 100 is changed, the countermeasure execution program 2400 transmits an instruction (maintenance recovery instruction) to cause the change target storage node to recover from maintenance, to the predetermined storage node 100 (for example, the storage node 100 serving as a representative of the cluster) (step S4405). As a result, the storage node 100 that has received the maintenance recovery instruction executes maintenance recovery processing (see FIG. 18). After the maintenance recovery instruction is issued, the countermeasure execution program 2400 waits until the maintenance recovery processing of the storage node 100 is completed.

Next, after the maintenance recovery processing of the storage node 100 is completed, the countermeasure execution program 2400 updates information of the entry corresponding to the change target storage node in the instance management table 3100 into specification information on a resource having the changed instance type (step S4406). Here, the specification information on the changed instance type can be acquired from an entry acquired from the instance type management table 3500 using the changed instance type ID 3603 of the target entry as a key.

Next, the countermeasure execution program 2400 records True into the countermeasure execution completion 3605 of the target entry in the countermeasure execution management table 3600 (step S4407), and advances the processing to step S4408.

In step S4408, the countermeasure execution program 2400 determines whether the countermeasure execution management table 3600 includes an entry in which the countermeasure execution completion 3605 is False and that is not a target of change trigger determination (step S4402).

As a result, when the countermeasure execution completion 3605 is False and the entry that is not the target of the change trigger determination (step S4402) is present (step S4408: Yes), the countermeasure execution program 2400 advances the processing to step S4401, and executes the subsequent processing on the entry that is present.

On the other hand, when the countermeasure execution completion 3605 is False and no entry that is not the target of the change trigger determination (step S4402) is present (step S4408: No), the countermeasure execution program 2400 ends the countermeasure execution processing.

Next, a configuration of the storage node of the storage system 1000 will be described.

Figure 16:
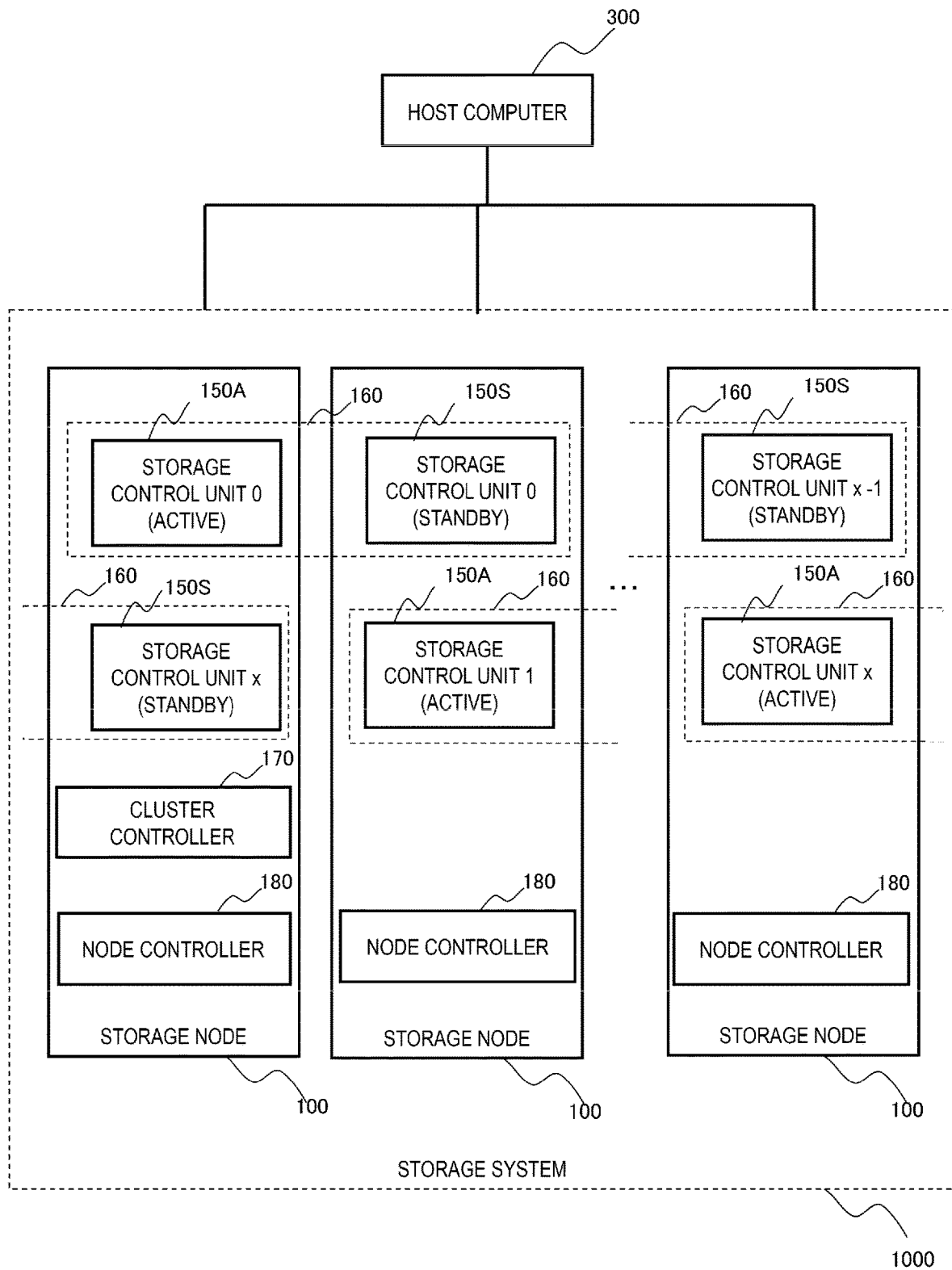
FIG. 16 is a configuration example of storage nodes of a storage system according to the embodiment.

FIG. 16 is a configuration example of the storage nodes of the storage system according to the embodiment.

The storage system 1000 includes one or more control unit clusters 160. The control unit cluster 160 includes a storage control unit 150A in an active state (also referred to as an active storage control unit) and a storage control unit 150S in a standby state (also referred to as a standby storage control unit). The storage control unit 150A provides a volume capable of I/O by the host computer 300. When an I/O request designating a volume to be provided is received from the host computer 300, the storage control unit 150A executes I/O processing on the designated volume. When the storage control unit 150A constituting the control unit cluster 160 is stopped, the storage control unit 150S is brought into an active state by performing failover, and executes I/O processing on the volume in place of the storage control unit 150A. The storage control unit 150A and the storage control unit 150S of the same control unit cluster 160 are configured in different storage nodes 100. In the storage system 1000, the representative storage node 100 of the clusters 160 includes a cluster controller 170. Each storage node 100 includes a node controller 180. The cluster controller 170 grasps a state of all the clusters 160 and controls a configuration of each storage node 100. The node controller 180 notifies the cluster controller 170 of information on the storage node 100, and controls the configuration of the storage node 100 according to an instruction from the cluster controller 170. In the present embodiment, the storage node 100 implements the storage control unit 150A, the storage control unit 150S of another control unit cluster 160, the cluster controller 170, and the node controller 180 using the instance 110.

Next, the maintenance closing processing (step S4500) will be described.

Figure 17:
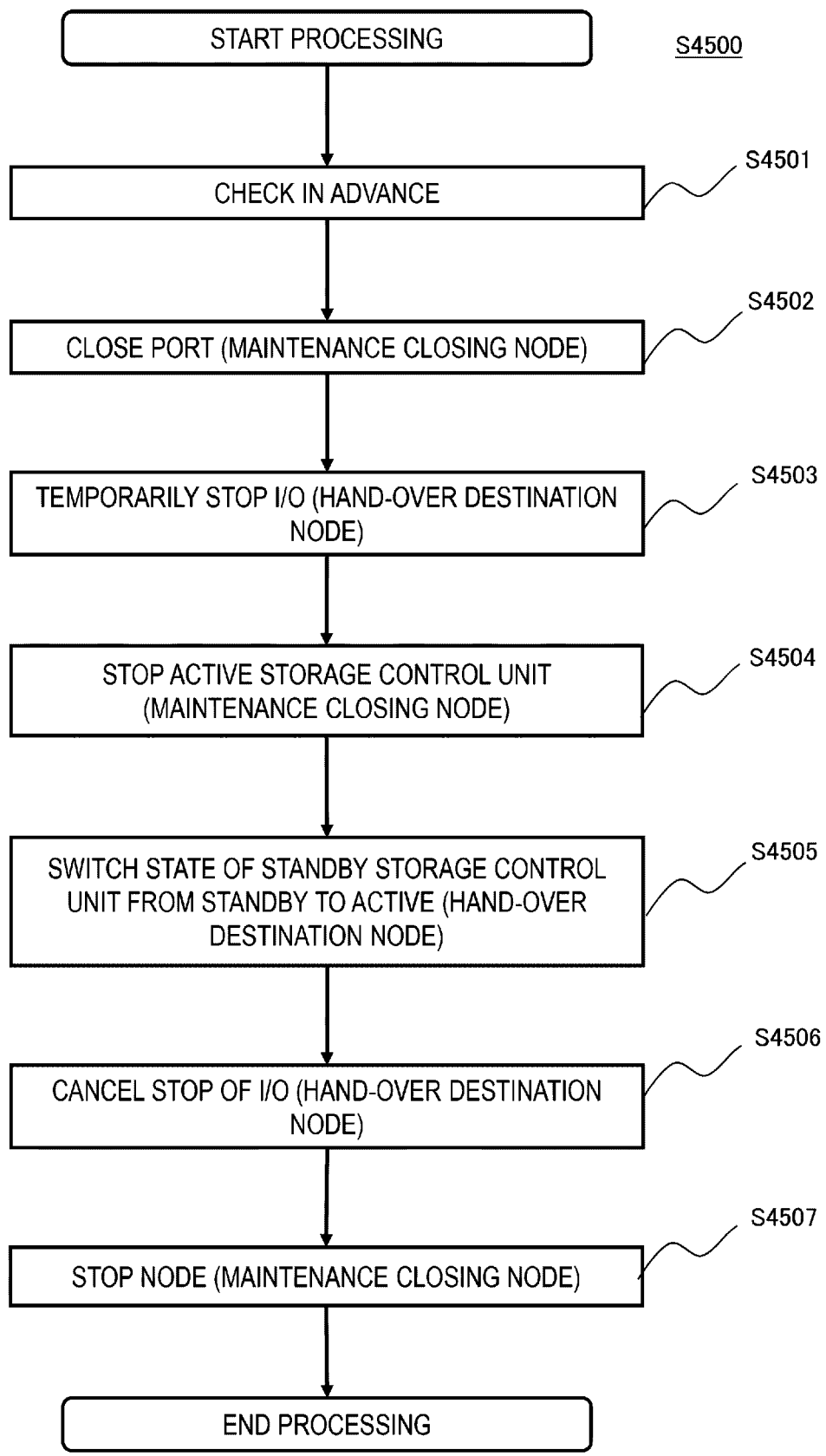
FIG. 17 is a flowchart of maintenance closing processing according to the embodiment.

FIG. 17 is a flowchart of the maintenance closing processing according to the embodiment.

The maintenance closing processing is executed when the cluster controller 170 of the storage node 100 receives a maintenance closing instruction from the management device 200.

The cluster controller 170 of the storage node 100 checks in advance whether the target storage node 100 can be closed for maintenance (step S4501). For example, the cluster controller 170 checks whether a failure, in which the processing cannot be handed over, occurs in a storage node to which the processing is to be handed over, that is, a storage node including the storage control unit 150S corresponding to the storage control unit 150A to be closed (also referred to as a hand-over destination node). If the failure has occurred, the maintenance closing processing is ended.

Next, the cluster controller 170 instructs the node controller 180 of the storage node 100 that is a maintenance closing target (also referred to as a maintenance closing node in description of this processing) to close a port for communicating with the host computer 300, and upon receiving the instruction, the node controller 180 closes the port according to the instruction (step S4502). When the port is closed, in the host computer 300, a transmission destination of the I/O request is switched to the hand-over destination node according to setting of the multipath.

Next, the cluster controller 170 instructs the node controller 180 of the hand-over destination node to temporarily stop reception of the host I/O, and the node controller 180 temporarily stops the reception of the host I/O in response to the instruction (step S4503).

Next, the cluster controller 170 instructs the node controller 180 of the maintenance closing node 100 to stop the active storage control unit 150A, and the node controller 180 stops the storage control unit 150A in response to the instruction (step S4504).

Next, the cluster controller 170 instructs the node controller 180 of the hand-over destination node 100 to switch (operate) the standby storage control unit 150S to an active state, and the node controller 180 switches the storage control unit 150S to the active state in response to the instruction (step S4505).

Next, the cluster controller 170 instructs the node controller 180 of the hand-over destination node to cancel stop of the host I/O, and the node controller 180 cancels the stop of the host I/O in response to the instruction (step S4506). Accordingly, the storage control unit 150S of the hand-over destination node can process the host I/O.

Next, the cluster controller 170 instructs the node controller 180 of the maintenance closing node 100 to stop the maintenance closing node 100, and when receiving the instruction, the node controller 180 stops the maintenance closing node 100 according to the instruction (step S4507), and ends the maintenance closing processing.

Next, the maintenance recovery processing (step S4600) will be described.

Figure 18:
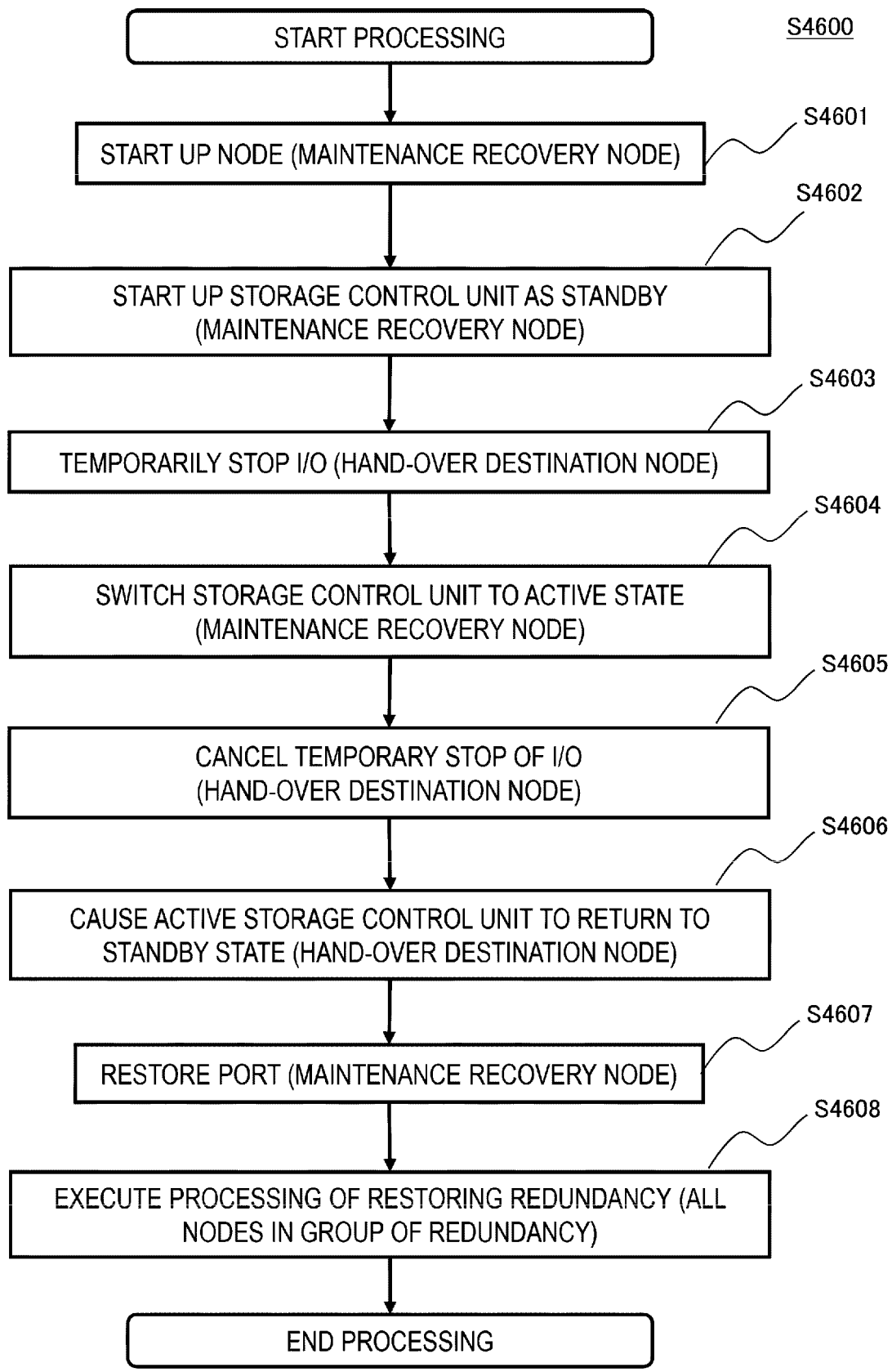
FIG. 18 is a flowchart of maintenance recovery processing according to the embodiment.

FIG. 18 is a flowchart of the maintenance recovery processing according to the embodiment.

The maintenance recovery processing is executed when the cluster controller 170 of the storage node 100 receives a maintenance recovery instruction from the management device 200.

The cluster controller 170 of the storage node 100 turns on power of the storage node 100 (maintenance recovery node) that is a maintenance recovery target, and starts up the node controller 180 (step S4601). At this time, the cluster controller 170 monitors a start-up status of the maintenance recovery node 100.

Next, the cluster controller 170 instructs the node controller 180 of the maintenance recovery node 100 to start up the storage control units 150A and 150S as standby, and the node controller 180 starts up the storage control units 150A and 150S as standby in response to the instruction (step S4602).

Next, the cluster controller 170 instructs the node controller 180 of the hand-over destination node to temporarily stop reception of the host I/O, and the node controller 180 temporarily stops the reception of the host I/O in response to the instruction (step S4603).

Next, the cluster controller 170 instructs the node controller 180 of the maintenance recovery node 100 to switch (operate) the standby storage control unit 150A to an active state, and the node controller 180 switches the storage control unit 150A to the active state in response to the instruction (step S4604).

Next, the cluster controller 170 instructs the node controller 180 of the hand-over destination node to cancel stop of the host I/O, and the node controller 180 cancels the stop of the host I/O in response to the instruction (step S4605).

Next, the cluster controller 170 instructs the node controller 180 of the hand-over destination node 100 to switch (operate) the active storage control unit 150S to a standby state, and the node controller 180 switches the storage control unit 150S to the standby state in response to the instruction (step S4506).

Next, the cluster controller 170 instructs the node controller 180 of the maintenance recovery node 100 to restore the port for communicating with the host computer 300, and upon receiving the instruction, the node controller 180 restores the port according to the instruction (step S4607). When the port is restored, in the host computer 300, the transmission destination of the I/O request is switched to the maintenance recovery node according to the setting of the multipath.

Next, the cluster controller 170 instructs the node controllers 180 of all the storage nodes 100 in a group for creating redundancy with the maintenance recovery node 100 to restore the redundancy, and upon receiving the instruction, each node controller 180 executes processing of restoring the redundancy according to the instruction (step S4608), and ends the maintenance recovery processing. Accordingly, the storage control unit 150A is constituted by the instance of the changed instance type, and the performance bottleneck does not occur.

The invention is not limited to the embodiment described above, and may be appropriately modified and implemented without departing from the gist of the invention.

For example, in the embodiment described above, the performance bottleneck is analyzed, and the configuration of the instance is changed so as to increase the resource amount of the resource that is the performance bottleneck. However, for example, it may be configured such that designation of an instance whose resource amount is to be increased is received from the user, and it is determined that a resource configuration needs to be changed according to the designation, and a configuration of the instance is changed so as to increase the resource amount.

In the embodiment described above, a part or all of the processing executed by the CPU may be executed by a hardware circuit. The programs in the embodiment described above may be acquired from a program source and installed. The program source may be a program distribution server or a storage medium (for example, a portable storage medium).

What is claimed is:

1. A storage management system comprising:
a storage system including a plurality of storage nodes; and
a management device, wherein
the storage node includes a storage device and an instance to which a resource is virtually allocated and that controls access to the storage device,
the storage management system further comprises an instance management node configured to manage the instance of the storage node,
instance types with different resource configurations available as instances are managed, and
the management device is configured to:
determine whether a configuration of the resource allocated to the instance of the storage node needs to be changed, and
specify an instance and a resource necessary for changing configuration and change an instance type so as to increase the specified resource of the specified instance and cause the resource configuration to be allocated on the specified instance to change,
further comprising a plurality of the instances,
wherein:
each of the instances has a corresponding storage control unit which is operated thereon and performs access control for a corresponding storage device;
a plurality of storage control units operated on different instance configure a storage control unit group, respectively;
a plurality of storage control units of the storage control unit group provide a volume in which a host computer can perform I/O, and include a storage control unit which is in active state for processing I/O to the volume and a storage control unit which is in a standby state for being handing over processing of the active state, and
wherein the storage management system:
when changing the instance type of instance in which the storage control unit in the active state operates,
changes the storage control unit in the inactive state in the storage control unit group to be active to be handing over processing and stops the storage control unit in the active state;
performs the change of the instance type in the state where the storage control unit in the active state stops; and
activates the stopped storage control unit to be in active state after the change of the instance type.

2. The storage management system according to claim 1, wherein
the management device is configured to:
determine whether a predetermined trigger for changing the configuration of the resource exists, and
transmit a change instruction to the instance management node when the predetermined trigger exists, and
the instance management node is configured to change the configuration of the resource of the specified instance when receiving the change instruction.

3. The storage management system according to claim 1, wherein
the management device is configured to, when changing the configuration of the resource, perform switching such that I/O processing from a host computer which is in the charge of the specified instance is executed by an instance of another storage node, and then change the configuration of the resource.

4. The storage management system according to claim 3, wherein
the another storage node includes an instance having a substitution function of executing the I/O processing in the charge of the specified instance, and
the management device is configured to, when changing the configuration of the resource, switch the I/O processing from the host computer to the storage node including the instance having the substitution function.

5. The storage management system according to claim 4, wherein
an instance of each of the plurality of storage nodes has a function of executing own I/O processing and a substitution function of executing I/O processing in the charge of another storage node.

6. The storage management system according to claim 1, wherein
the management device is configured to identify another resource that newly becomes a bottleneck when the resource is increased, and change a configuration of the another resource of the specified instance so as to increase the another resource.

7. The storage management system according to claim 1, wherein
the management device is configured to:
designate an enhanced resource amount that is a resource amount in which operation performance of the identified resource satisfies a predetermined reference value, and
change the configuration of the resource of the instance such that the resource amount is greater than or equal to the enhanced resource amount.

8. The storage management system according to additional claim 1, wherein
whether the storage control unit group has another storage control unit which is in active state or which can be changed to be in active state is examined; and
the change of the instance type is performed when there is another storage control unit which is in active state or which can be changed to be in active state.

9. The storage management system according to claim 1, wherein
the management device is configured to:
collect operation information on the storage system from the storage system, and identify, based on the operation information, the resource that is a performance bottleneck for the specified instance of the storage system and that needs to be changed in configuration, and
change the configuration of the resource of the specified instance so as to increase the identified resource.

10. The storage management system according to claim 9, wherein
an instance type with a different resource configuration that can be used for the specified instance is managed, and
the management device is configured to:
identify the instance type configured to increase the identified resource, and
change the configuration of the resource to the resource configuration of the identified instance type.

11. A storage management method performed by a storage management system including: a storage system including a plurality of storage nodes; and a management device, wherein
the storage node includes a storage device and an instance to which a resource is virtually allocated and that controls access to the storage device, and
the storage management system further comprises an instance management node configured to manage the instance of the storage node, and
instance types with different resource configurations available as instances are managed,
the method, performed the management device, comprising the steps of:
determining whether a configuration of the resource allocated to the instance of the storage node needs to be changed,
specifying an instance and a resource necessary for changing configuration,
changing an instance type so as to increase the specified resource of the specified instance, and
cause the resource configuration to be allocated on the specified instance to change,
further comprising a plurality of the instances,
wherein:
each of the instances has a corresponding storage control unit which is operated thereon and performs access control for a corresponding storage device;
a plurality of storage control units operated on different instance configure a storage control unit group, respectively;
a plurality of storage control units of the storage control unit group provide a volume in which a host computer can perform I/O, and include a storage control unit which is in active state for processing I/O to the volume and a storage control unit which is in a standby state for being handing over processing of the active state, and
wherein the storage management system:
when changing the instance type of instance in which the storage control unit in the active state operates,
changes the storage control unit in the inactive state in the storage control unit group to be active to be handing over processing and stops the storage control unit in the active state;
performs the change of the instance type in the state where the storage control unit in the active state stops; and
activates the stopped storage control unit to be in active state after the change of the instance type.

12. The storage management method according to claim 11, further comprising:
collecting operation information on the storage system from the storage system, and identify, based on the operation information, the resource that is a performance bottleneck for the specified instance of the storage system and that needs to be changed in configuration, and
changing the configuration of the resource of the specified instance so as to increase the identified resource.

13. The storage management method according to claim 11, wherein
an instance type with a different resource configuration that can be used for the specified instance is managed, and
the method further comprising the steps of:
identifying the instance type configured to increase the identified resource, and
changing the configuration of the resource to the resource configuration of the identified instance type.

* * * * *